United States Patent [19]

Langdon et al.

[11] 4,287,078

[45] Sep. 1, 1981

[54] SURFACTANTS DERIVED FROM THE REACTION PRODUCT OF POLYOXYALKYLENE POLYOLS AND POLYGLYCIDYL ETHERS AND GLYCOL-BASED ANTIFREEZE USING SAME

[75] Inventors: William K. Langdon; Lester G. Lundsted, both of Grosse Ile, Mich.

[73] Assignee: BASF Wyandotte Corporation, Wyandotte, Mich.

[21] Appl. No.: 115,793

[22] Filed: Jan. 28, 1980

[51] Int. Cl.$^3$ .................. C09K 5/00; C07C 43/10
[52] U.S. Cl. ........................ 252/76; 252/73; 252/79; 252/174.17; 252/174.21; 252/321; 252/358; 536/120; 568/623; 568/624
[58] Field of Search ............ 536/120; 252/73, 76, 252/75, 77, 79, 321, 358, 174.17, 174.21, DIG. 1; 568/623, 624, 620

[56] References Cited

U.S. PATENT DOCUMENTS

| | | | |
|---|---|---|---|
| 2,902,478 | 9/1959 | Anderson | 536/120 |
| 2,923,686 | 2/1960 | Ohlmann | 252/74 |
| 2,927,918 | 3/1960 | Anderson | 536/120 |
| 2,996,551 | 8/1961 | De Groote et al. | 536/120 X |
| 3,931,029 | 1/1976 | Dutton et al. | 252/76 |
| 4,011,389 | 3/1977 | Langdon | 536/120 X |

*Primary Examiner*—Harris A. Pitlick
*Attorney, Agent, or Firm*—H. Lawrence Jones

[57] ABSTRACT

A material formed by the reaction of (1) a poly-2-hydroxyalkyl derivative of a polyol having at least five hydroxyl groups, with at least three, and preferably nearly all, of said hydroxyl groups being substituted with one or more 2-hydroxyalkyl groups and (2) a polyglycidyl ether of a polyol, preferably a di- or triglycidyl ether of a polyoxyalkylene diol or triol. These materials have surfactant and defoaming abilities, and are useful in hard surface cleaning, textile and paper applications, and as defoaming agents. The compounds are especially useful as defoaming agent for glycol based antifreeze mixtures, and such antifreeze mixtures are also provided.

18 Claims, No Drawings

SURFACTANTS DERIVED FROM THE REACTION PRODUCT OF POLYOXYALKYLENE POLYOLS AND POLYGLYCIDYL ETHERS AND GLYCOL-BASED ANTIFREEZE USING SAME

BACKGROUND OF THE INVENTION

1. Field of the Invention

This invention relates to surfactants made by the reaction of polyoxyalkylene polyols and polyglycidyl ethers, and to glycol-based antifreeze compositions including same as a foam suppressing agent.

2. Description of the Prior Art

Surfactants using sugar groups as the hydrophilic group are known. In general, these surfactants utilize a long chain aliphatic group for the hydrophobic group. U.S. Pat. No. 3,737,426 discloses an adduct made by adding alkylene oxide to glycoside derived from starch at a plurality of sites and then reacting this product with a long chain aliphatic 1,2-epoxide. However, the use of a polyoxyalkylene polyglycidyl ether as the hydrophobe moiety is not suggested. In addition, the epoxide coupling suggested by the patentee terminates the chain on which it attaches.

U.S. Pat. No. 3,018,282 discloses a surfactant made from sucrose. In the first step sucrose is reacted with an alkylene oxide using an acid catalyst, and then the reaction product is reacted with a long chain fatty acid chloride to provide an ester addition of a long chain fatty acid. There is no showing of the addition of a polyfunctional group in either patent. In addition, there is no suggestion of the use of such products as a defoaming agent in antifreeze compositions.

Glycol-based antifreeze formulations containing corrosion inhibitors such as borates, silicates, phosphates, caustic, mercaptobenzothiazole, tolyltriazole, nitrates, nitrites and other inhibitors listed in the patent literature do not, by themselves, exhibit excessive foaming tendencies. However, when these glycol-based antifreezes containing the above-mentioned inhibitors are diluted with water for use in internal combustion engine cooling systems, excessive foaming occurs. This foaming causes a loss of coolant from the system and possible subsequent damage to the engine.

It is common practice to include in the glycol-based antifreeze formulations an agent or combination of agents to reduce the foaming of the water-diluted base antifreeze solution. The most commonly used defoaming agents are silicones and polymers of ethylene oxide or propylene oxide or ethylene oxide and propylene oxide copolymers commonly referred to as polyols. The latter type of defoaming agent has been used extensively, and certain modifications thereof have also been used. For example, U.S. Pat. No. 2,923,686 teaches the adduct of propylene oxide and ethylene oxide on glycerol, with each hydroxyl group of the glycerol nucleus being provided with an adduct. These compounds generally have a very low water solubility, but the solubility is sufficient to form a unitary phase in the very low concentrations used.

Certain desirable corrosion inhibitor systems are particularly likely to increase the foaming problem when placed in automobile cooling systems. For example, an excellent corrosion inhibitor is disclosed and claimed in U.S. Pat. No. 3,931,029. In this patent, a polymer of ethylene oxide and propylene oxide is suggested as a defoaming agent.

Antifreeze normally is formulated with 0.03 to 0.05% of defoaming agent. This concentration is necessary to maintain adequate defoaming action for the life of the permanent type antifreeze. A defoaming agent such as the polyol of U.S. Pat. No. 3,931,029 is normally used in the above concentration range. If added to the radiator within a relatively short period of time after it has been formulated, no problem exists, but frequently large scale users, such as the large automobile companies, store the antifreeze in large tanks that contain many thousands of gallons. Upon standing for several days to several months, the defoaming agent rises, forming an upper liquid layer. As a result, when antifreeze is drawn from the base of the tank it is deficient in defoamer and, if the tank is emptied completely, the last portion will be only defoamer, which is completely unsatisfactory as an antifreeze stock. This has been a very serious problem to antifreeze consumers as well as to antifreeze producers.

SUMMARY OF THE INVENTION

The surfactant compositions of the invention are made by reacting (1) a poly-2-hydroxyalkyl derivative of a polyol normally having at least five hydroxyl groups, with at least three of said hydroxyl groups being substituted with three or more 2-hydroxyalkyl groups to form the derivative, and (2) a polyglycidyl ether of a polyoxyalkylene polyol. The polyol normally having at least five hydroxyl groups is preferably a sugar such as glucose or sucrose or a polyol related to or derived from a sugar such as sorbitol. The 2-hydroxyalkyl substituents are substituted for hydrogens on at least three of the hydroxyl groups, and preferably substantially all of the hydroxyl groups. These 2-hydroxyalkyl substituents include 2-hydroxyethyl, 2-hydroxypropyl and 2-hydroxybutyl groups. At least 50% of the 2-hydroxyalkyl groups are 2-hydroxypropyl or 2-hydroxybutyl groups, and the preferred 2-hydroxyalkyl groups are 2-hydroxypropyl groups.

Thus, the poly-2-hydroxyalkyl derivative of a polyol utilized as a reactant to form the surfactants of the invention has the formula

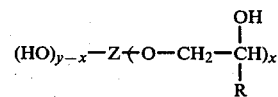

wherein Z is the nucleus of a polyol normally having y hydroxyl groups, y is an integer from 5 to 8, x is an integer from 3 to y, and R is hydrogen, methyl or ethyl with at least 50% of the R groups being methyl or ethyl.

The polyglycidyl ether reactant is derived from a polyoxyalkylene polyol such as oxyalkylated glycol or glycerol by conversion of the hydroxyl groups thereof to glycidyl ethers. For example, the derivative of an oxyalkylated glycol is typically a diglycidyl ether having the formula

wherein R is hydrogen, methyl or ethyl with at least 50% of the R groups being methyl or ethyl groups, and n is an integer from 1 to 40. Similarly, triglycidyl ethers are made by conversion of the hydroxyl groups of oxyalkylated glycerol.

The polyglycidyl ether reactants are of the hydrophobic class, and provide the hydrophobic moiety to the surfactants of the invention. These surfactants have a number of uses such as in hard surface cleaning and textile and paper application. However, the compositions are especially useful as defoamers in antifreeze formulations, and one form of the invention includes such improved antifreeze compositions.

The use of the surfactants of the invention as defoaming or foam suppressing agent is particularly valuable when used with antifreeze formulations containing the corrosion inhibitor of U.S. Pat. No. 3,931,029, cited above, and insofar as the preparation and use of such inhibitors are pertinent herein, the patent disclosure is hereby incorporated by reference. In general, the inhibitors of the patent are referred to broadly as diacid inhibitors and have the following general formula

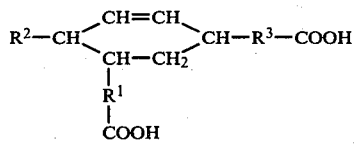

wherein $R^1$ is an alkylene radical containing from 0 to 12 carbon atoms, $R^2$ is an alkyl radical containing from 1 to 10 carbon atoms, and $R^3$ is an alkylene radical containing from 1 to 12 carbon atoms. The inhibitor also includes the mono- and di- metal salts, the mono- and di- ammonium salts, and the mono- and di- amides of the diacid diagrammed above. The preferred diacid inhibitor is 1-carboxy-2-hexyl-5-(7-carboxyheptyl)-cyclohex-3-ene.

DESCRIPTION OF THE PREFERRED EMBODIMENTS

Products of this invention are made by reacting a hydrophilic compound with a hydrophobic compound, in which the reactants are both polyfunctional at their reaction sites. In this way, molecules may be formed which contain a plurality of both hydrophilic and hydrophobic groups.

The hydrophobic compounds used in the preparation of products made according to the invention are prepared from a polyoxyalkylene polyol by replacing at least 50%, and substantially all, of the active hydrogen atoms of the hydroxyl groups with 2,3-epoxypropyl groups or chlorohydrin groups. Examples of suitable polyoxyalkylene polyols that may be used are polyoxypropylene and polyoxybutylene diols, triols and tetrols, and mixtures thereof, having molecular weights greater than about 300. Additionally, the polyoxyalkylene polyols may be composed of oxyethylene, oxypropylene or oxybutylene in heteric or block configuration.

For example, when a polyoxyalkylene diol is used, and converted to the diglycidyl ether, the reactant has the formula

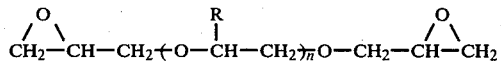

wherein R is hydrogen, methyl or ethyl with at least 50% of the R groups being methyl or ethyl, and n is an integer from 1 to 40. The number of instances where R is hydrogen is less than 50% in order to provide a sufficiently hydrophobic reactant. Similarly, polyoxyalkylene triols and tetrols are converted to a tri- or tetraglycidyl ether by addition of 2,3-epoxypropyl groups or equivalent chlorohydrin. Certain of these oxirane-containing hydrophobe materials are available commercially. For example, a triglycidyl ehter of oxypropylated glycerol is sold by Procter & Gamble Company as Epoxide No. 151. Other desired polyglycidyl ethers may be prepared by known methods.

Thus, it is convenient to obtain the oxirane-containing hydrophobe material by reacting a hydrophobic glycol or glycerol with epichlorohydrin, thus obtaining a polychlorohydrin ether which may, if desired, be reacted with caustic to effect a ring closure and obtain a derived hydrophobic polyglycidyl ether. In some cases, the polychlorohydrin ether itself may be mixed with the hydrophilic compound and reacted with it under alkaline conditions; when this is done, the oxirane-containing hydrophobe is, in effect, formed in situ and then reacted with the hydrophile.

One form of the oxirane-containing hydrophobe is derived from a lower alkylene glycol, reacted with several moles of a lower alkylene oxide to form a hydrophobic adduct which is then reacted with epihalohydrin to form a dihalohydrin or diglycidyl ether. In such material a hydrophobic effect is obtained if a ratio of oxygen/carbon atoms less than 0.4 prevails; in other words, although some ethylene oxide may be used, it is essential to use enough propylene oxide or butylene oxide to ensure that the resulting material is hydrophobic. However, the various units may be added either as a heteric mixture or in sequence. In the preferred area of the invention, the alkylene oxide utilized is propylene oxide.

The other forms of the oxirane-containing hydrophobe is derived from a triol or tetrol obtained by reacting several moles of a lower alkylene oxide with a triol or tetrol such as glycerol or pentaerythritol to form a hydrophobic adduct which is then reacted with epihalohydrin to form a corresponding polyhalohydrin or polyglycidyl ether. As explained above, a hydrophobic effect is obtained if a ratio of oxygen/carbon atoms is less than 0.4. In the preferred area of the invention, propylene oxide is reacted onto a propylene glycol nucleus, and the diglycidyl ether is formed therefrom.

The hydrophilic reactant is an alkoxylated derivative of any polyhydroxyalkyl sugar or sugar derivative that is sufficiently physically compatible with the hydrophobic reactant to have its hydroxyl groups undergo reaction with the glycidyl ether functions. In general, the sugar polyols will be any sugar having from 5 to 8 hydroxyl groups such as sucrose, dextrose, galactose, and mannose. The sugar derivative suitable as starting polyols include reduction products such as sorbitol, and lower glycol glucosides such as propylene glycol glycoside or glucoside.

In order to provide the desired reactivity in the hydrophile, it is necessary that a substantial portion of the hydroxyl groups of the sugar or sugar derivative be substituted with hydroxyalkyl groups. Thus, at least three and preferably substantially all of the hydroxyl groups of the sugar or sugar derivatives are substituted with hydroxyalkyl groups. The hydroxyalkyl groups are derived from lower alkylene oxides including ethylene oxide, propylene oxide, and butylene oxide. However, when ethylene oxide is used, it is used in admixture with propylene oxide or butylene oxide or both, with the amount of ethylene oxide not exceeding 50% on a mole basis. The 50% or lower molecular ratio of ethylene oxide is desirable because these substituents of the hydrophile react with and essentially become part of the hydrophobic moieties, and to provide polyols that are sufficiently hydrophobic to provide a compatible reaction mixture. Thus, these preliminary addition reactions are required, because the parent polyhydroxy compounds and their low molecular weight glycoside derivatives are not sufficiently compatible with the hydrophobic glycidyl ether reactant to undergo satisfactory reaction. Hydroxyl groups of the present polyhydroxy compounds preferably should be mono-substituted and contain a minimum of linear polyoxyalkylene function. The ratio of carbon atoms to hydroxyl groups preferably should be 2.5 or greater in order to have a physically compatible reaction system.

In order to provide the desired 2-hydroxyalkyl substituents on the sugar or sugar derivative, the sugar or sugar derivative is reacted with an alkylene oxide in the presence of a lower alkyl tertiary amine catalyst. Such reactions are described in depth in U.S. Pat. No. 2,902,478 and U.S. Pat. No. 2,927,918, and insofar as these disclosures are pertinent, they are hereby incorporated by reference. The lower trialkylamines tend to cause the alkylene oxides to react with all of the available hydroxyl groups of the polyol in preference to forming a chain on the first reaction site. In the case of propylene oxide addition, triethylamine, tripropylamine, or tributylamine generally catalyze the reaction of one and only one mole of propylene oxide with each hydroxyl group of the polyol.

The amount of trialkylamine used as catalyst is not critical. As little as a few hundredths of one percent, based on the polyol, is frequently effective, but it is preferred to use at least about 0.1%. However, there is no reason to use amounts greater than about 5%. Thus, the preferred range is about 0.1 to 2% depending to some extent on the reaction temperature and the oxide and polyol used in the reaction.

The reaction temperature is generally kept at a value sufficiently above the minimum temperature to achieve reaction and provide the desired reaction rate. The minimum for the oxides and polyols used is about 80° C. to 90° C., and it is preferred to use, say, 100° C. to 120° C. At the higher temperatures, the reaction is rather rapid in the early part of the reaction process. Therefore, it is preferred to mix the catalyst with the polyol, heat the mixture to reaction temperature, and add the alkylene oxide at about the rate at which it reacts. In this way, a steady reaction rate and accurate temperature control may be obtained.

As is usual in oxyalkylation processes, it is desirable to exclude water and oxygen during the reaction period and to use reagents free of moisture, aldehydes and other interfering materials.

The hydrophilic polyol and hydrophobic polyglycidyl ether is then reacted in a final reaction step. This reaction is catalyzed by basic catalysts. Accordingly, at the conclusion of the formation of the polyglycidyl ether, it is customary to add to the reaction mixture a sufficient quantity of basic material, such as potassium hydroxide or sodium hydroxide, to neutralize the acid or available acid from organic chlorine that is present and provide a small quantity of basic material to catalyze the final reaction. It is usually not necessary or desirable to remove the salt that is formed by the neutralization of the acid catalyst.

In the final reaction, there is usually used about 0.5 to 6.0 moles of polyglycidyl ether per mole of the polyol. Preferably, the ratio is about 0.8 to 4.0.

The final reaction step is generally conducted under conditions of temperature and pressure that are, on the one hand, sufficient to get a satisfactory rate of reaction and, on the other hand, not so stringent as to cause any appreciable degradation of the product. Ordinarily, temperatures such as 80° to 160° and pressures ranging from the atmospheric down to 2 or 3 millimeters of mercury absolute pressure are employed. The reaction time depends principally upon the temperature employed and to some extent upon the scale of the reaction, and it may range from about 20 minutes to several hours.

The oxirane-containing hydrophobe which is reacted with the polyol described above is believed to be capable of reacting readily with any of the hydroxyl groups present anywhere within the structure of the polyol. Thus with polyfunctional groups present in both reactants, a rather complicated high molecular weight mixture of cross-linked monomers is expected to be formed. However, in the form of the invention now preferred, the reaction mixture is utilized as is.

There is also a certain amount of chlorine substituted in some of the molecules as a side reaction in the preparation of the oxirane compounds. However, only a small percentage of molecules are so substituted and these materials need not be removed.

Depending upon the structure of the hydrophilic and hydrophobic moieties and their ratio to each other, wide variations in properties of the surfactants can be made. These products are soluble in water and in glycol-based antifreeze and, unexpectedly, were found to be excellent defoaming agents for glycol-based antifreeze when tested under conditions set forth in ASTM D-1881-7.

The products also have good surface activity as indicated by surface tensions in the range of 30 dynes per centimeter and Draves sink times in the range of 45-60 seconds at 0.1% concentration. The combination of surface activity and defoaming ability is unexpected. Thus, the surfactants have a potentially wide usage in a large number of applications including hard surface cleaning, textile and paper applications, as well as in glycol-based antifreeze formulations.

The invention described above is illustrated by the following specific examples, in which parts are by weight unless otherwise specified. The examples are to be interpreted as illustrative only, and not in a limiting sense.

EXAMPLE 1

Preparation of Polyglycidyl Ethers

Example 1a—Diglycidyl Ether Prepared from Polypropylene Glycol of about 775 Molecular Weight The polypropylene glycol used in this example was a proprietary product made by adding propylene oxide to a propylene glycol nucleus. It has a molecular weight of 775, and a viscosity at 100° F. of 65 (cps). To a flask equipped with a stirrer, thermometer, condenser and addition funnel, there were added 914 grams of the above described polypropylene glycol and 1.8 grams of boron fluoride etherate catalyst. The contents of the flask were warmed to a temperature of 50° to 65° C. and retained in this range while 232 grams of epichlorohydrin were added from the addition funnel over a period of 55 minutes. Stirring was continued at 50° to 65° C. for a period of 2 hours and 20 minutes to provide 1147 grams of product.

The product was then added to 750 grams of a 40 weight percent aqueous solution of sodium hydroxide in a 3-liter flask which had been warmed to 25° to 30° C. with stirring over a 30-minute period. The mixture was retained at 25° to 30° C. and stirred for an additional 30 minutes. The reaction mixture was then diluted with 600 milliliters water to dissolve the sodium chloride. The organic layer was separated to provide 1090 grams of crude product. The crude product was stripped at 2 millimeters mercury absolute pressure at 72° C. to provide 1045 grams of stripped product. Thereafter the product was treated with synthetic magnesium silicate, and filtered to remove any residual base that may have been present.

Analysis of the product indicated an oxirane oxygen content of 2.87 weight percent, a chlorine content of 2.0 weight percent, and a hydroxyl number of 24. The product is thus a diglycidyl ether having, as a major component, a compound having a structural formula of

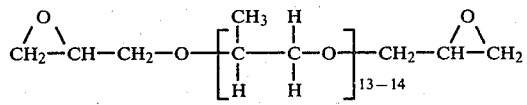

Example 1b-Diglycidyl Ether Prepared from Polypropylene Glycol of about 1058 Molecular Weight The procedure of Example 1a was repeated except that a proprietary propylene glycol having a molecular weight of about 1058 was used as a starting material.

Analysis of the product thus obtained indicated an oxirane oxygen content of 2.37 weight percent, a chlorine content of 2.1 weight percent, and a hydroxyl number of 20.0. The product is thus a diglycidyl ether having, as a major component, a compound having a structural formula of

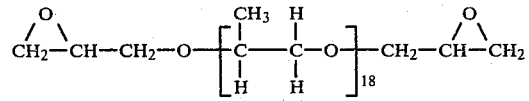

Example 1c—Diglycidyl Ether Prepared from Polypropylene Glycol of about 1996 Molecular weight The procedure of Example 1a was repeated except that a proprietary propylene glycol having a molecular weight of about 1996 was used as a starting material.

Analysis of the product thus obtained indicated an oxirane content of 1.29 weight percent, a chlorine content of less than 0.5 weight percent, and a hydroxyl number of 18.4. The product is thus a diglycidyl ether having, as a typical component, a compound having the structural formula of

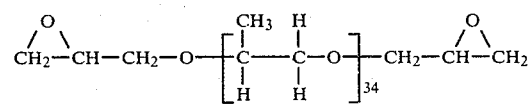

Example 1d—Triglycidyl Ether of Oxypropylated Glycerol

The product used in this Example is a proprietary product of Procter & Gamble Company, sold under the trade name "Epoxide No. 151". According to their data sheet, the typical product has an equivalent weight of 675 per epoxide unit, 2.4% oxirane oxygen and total chloride of 1.4%. On the basis of the equivalent weight, the original glycerol polyol would have had a molecular weight of approximately 1800.

EXAMPLE 2

Preparation of Hydrophilic Reactants

Example 2a—Preparation of Poly-2-Hydroxypropyl Sucrose

The product used in this Example is a proprietary product made by the addition of propylene oxide to sucrose in the presence of a small amount of propylene glycol as a solvent and tri-n-butylamine as the catalyst. This propylene oxide adduct to sucrose has an average molecular weight of approximately 640 and a hydroxyl number of 570. The average functionality of the product is about 6.5.

Example 2b—Preparation of Poly-2-Hydroxyalkyl Sorbitol

A one-gallon autoclave was charged with 737 grams of sorbitol, 114 grams of propylene glycol, and 3.5 grams of tri-n-butylamine. The autoclave was heated to 135° C. and purged with nitrogen. Then a blend of 1720 grams of propylene oxide and 430 grams of ethylene oxide (80:20 proportion by weight) was added over a period of 9 hours. The resulting product was stripped to 110° C. at less than 10 millimeters absolute pressure and held for 1 hour. The final product had a hydroxyl number of 54.8 which is equivalent to an average molecular weight of 483. The calculated average functionality is 4.72.

Example 2c—Preparation of Poly-(2-Hydroxypropyl)-Propylene Glycol Glycoside

First, a propylene glycol glycoside was prepared by charging a 12-liter, 3-neck flask with 7030 grams propylene glycol (92 moles), and 27.5 grams of concentrated sulfuric acid. 4232 grams of Globe cornstarch (23 moles of active glucose units) were added gradually with stirring at room temperature. After the reaction was completed, the mixture was heated to 120° C. and stripped by reducing the pressure to about 100 millimeters mercury absolute over a period of 1 hour and 42 minutes, during which time 513.6 grams of water were removed. The product was then cooled to 73° C., and 64 grams of powdered calcium carbonate and 6 grams defoamer (PLURONIC L-61) were added.

A second stripping from 105° C. at 105 millimeters to 142° C. at 4 millimeters mercury absolute was then carried out in 4½ hours. 5764 grams of propylene glycol were removed in this stripping. The stripped product of 4232 grams (100% assay) was diluted with 4232 grams of tap water, which was added slowly (½ hour) through the addition funnel with the temperature dropping from 117° C. to 93° C. and the pressure adjusted to one atmosphere by release with nitrogen. 192 grams of decolorizing charcoal were added and after 1 hour and 35 minutes at a temperature ranges of 85°–95° C., 100 grams of filter aid were added in 10 minutes. The mixture was then filtered. The filtrate (7862 grams) and 100 grams wash water was again treated with 150 grams of decolorizing charcoal at 40° C. and filtered again. Water was stripped to provide a solution containing 79% of propylene glycol glycoside and 21% water.

To a 1-liter, 4-neck flask, 293 grams (1 mole) of this propylene glycol glycoside was charged and stripped of water by heating to 145° C. and 3 millimeters absolute pressure. The take-off in 50 minutes was 64.9 grams. The reactor was cooled and the vacuum released with nitrogen. The flask was heated to 125° C. at one atmosphere, and 5.4 grams of tri-n-butylamine were added in three stages. The propylene oxide (265 grams) was added slowly over a period of 49 hours and 24 minutes with the reaction flask being kept at about 125° C. to 135° C. The reaction product was stripped of 20.5 grams of water by heating at reduced pressure to a final value of 110° C. at 3 millimeters mercury. The reaction flask was cooled and released with nitrogen at 90° C. to provide 478 grams of a dark stripped product. The product is primarily a tetra(2-hydroxypropyl)propylene glycol glycoside having a molecular weight of 470.

EXAMPLE 3

SURFACTANTS MADE BY REACTION OF HYDROPHOBES OF EXAMPLE 1 WITH HYDROPHILES OF EXAMPLE 2

Example 3a—Reaction Product of Sucrose Polyol and Diglycidyl Ether Having about 13 Propylene Oxide Units A reaction flask was charged with 150 grams of the product of Example 2a (sucrose polyol) and 5 grams of 50% sodium hydroxide. The mixture was stripped up to 158° C. at 3 millimeters mercury absolute pressure. After cooling to 140° C., pressure was released with nitrogen. The product of Example 1a was added in an amount of 150 grams over a period of 25 minutes at a temperature between 140° C. and 164° C. (except for a momentary exotherm). The reaction mixture was then heated for 2 hours at approximately 160° C. to complete the reaction. 298.7 grams of a product which is highly viscous at room temperature is obtained. Therefore, dilution to 80% solids is advisable.

A 0.1% solution of the product is a clear solution having a pH of 9.25, a surface tension of 36.0 dynes per centimeter, a Draves sink time of 45 seconds, a dynamic foam height at 77° F. at 400 milliliters per minute of 155/0; the first value being the height in millimeters after 10 minutes, and the second value being the height in millimeters remaining after 10 minutes in the quiescent state and a dynamic foam height at 120° F. at 400 milliliters per minute of 0. The cloud point of a 1.0% solution was 33.5° C.

Example 3b—Reaction Product of Sucrose Polyol and Diglycidyl Ether Having about 18 Propylene Oxide Units The procedure of Example 3a was repeated, except that the diglycidyl ether product of Example 1b was used in place of the diglycidyl ether of Example 1a. The resulting product was tested and a 0.1% solution had a surface tension of 37.2 dynes per centimeter, a Draves sink time of 39.7 seconds, a dynamic foam height at 77° F. at 400 milliliters per minute of 135/30, and a dynamic foam height at 120° F. at 400 milliliters per minute of 0. The cloud point of a 1.0% aqueous solution was 31° C.

Example 3c—Reaction Product of Sucrose Polyol and Diglycidyl Ether Having about 34 Propylene Oxide Units The procedure of Example 3a was repeated, except that the diglycidyl ether product of Example 1c was used in place of the diglycidyl ether of Example 1a. The resulting product was tested and a 0.1% aqueous solution had a surface tension of 35.3 dynes per centimeter, a Draves sink time of 80.4 seconds, a dynamic foam height at 77° F. at 400 milliliters per minute of 20/5, and a dynamic foam height at 120° F. at 400 milliliters per minute of 0. The cloud point of a 1.0% aqueous solution was 20°-24° C.

Example 3d—Reaction Product of Sucrose Polyol and a Triglycidyl Ether of Oxypropylated Glycerol A reaction flask was charged with 100 grams of the product of Example 2a (sucrose polyol) and 1 gram of 90% potassium hydroxide and the mixture was warmed with stirring to 140° C. Then 100 grams of the triglycidyl ether of Example 1d was added over a period of 20 minutes. The reaction mixture was kept at about 140° C. with stirring for another 1½ hours. The product was a water-soluble, viscous, amber liquid.

A 0.1% aqueous solution was clear and had a pH of 8.85. This test solution also had a surface tension of 34.7 dynes per centimeter, a Draves sink time of 53.1 seconds, a dynamic foam height at 77° F. at 400 milliliters per minute of 110/30, and a dynamic foam height at 120° F. at 400 milliliters per minute of 0. The cloud point of a 1.0% solution was 30.5° C.

Example 3e—Reaction Product of Sorbitol Polyol and Diglycidyl Ether Having about 13 Propylene Oxide Units Using the procedure of Example 3a, equal weight quantities of sorbitol polyol (product of Example 2b) and a diglycidyl ether having about 13 propylene oxide units (product of Example 1a) were reacted with sodium hydroxide as catalyst. The resulting product was tested and a 0.1% aqueous solution had a surface tension of 35.5 dynes per centimeter, a Draves sink time of 43.4 seconds, a dynamic foam height at 77° F. at 400 milliliters per minute of 125/30, and a dynamic foam height at 120° F. at 400 milliliters per minute of 0. The cloud point of a 1.0% aqueous solution was 31.5° C.

Example 3f—Reaction Product of Sorbitol Polyol and Diglycidyl Ether Having about 18 Propylene Oxide Units Using the procedure of Example 3a, equal weight quantities of sorbitol polyol (product of Example 2b) and a diglycidyl ether having about 18 propylene oxide units (product of Example 1b) were reacted with sodium hydroxide as catalyst. The resulting product was tested and a 0.1% aqueous solution had a surface tension of 35.0 dynes per centimeter, a Draves sink time of 51.8 seconds, a dynamic foam height at 77° F. at 400 milliliters per minute of 105/34, and a dynamic foam height at 120° F. at 400 milliliters per minute of 0. The cloud point of a 1.0% aqueous solution was 31.0° C.

Example 3g—Reaction Product of Sorbitol Polyol and Diglycidyl Ether Having about 34 Propylene Oxide Units Using the procedure of Example 3a, equal weight quantities of sorbitol polyol (product of Example 2b)

and a diglycidyl ether having about 34 propylene oxide units (product of Example 1c) were reacted with sodium hydroxide as catalyst. The resulting product was tested and a 0.1% aqueous solution had a surface tension of 34.1 dynes per centimeter, a Draves sink time of 44.4 seconds, a dynamic foam height at 77° F. at 400 milliliters per minute of 5/2, and a dynamic foam height at 120° F. at 400 milliliters per minute of 0. The cloud point of a 1.0% aqueous solution of the product was 10°–14° C.

Example 3h—Reaction Product of Sorbitol Polyol and a Triglycidyl Ether of Oxypropylated Glycerol A reaction flask was charged with 100 grams of sorbitol polyol (product of Example 2b) and 1 gram of 90% potassium hydroxide and the mixture was heated to 120° C. to dissolve the potassium hydroxide. Then 100 grams of the triglycidyl ether of Example 1d was added over a period of 16 minutes at a temperature of 128°–133° C. The mixture was kept in this temperature range with stirring for 1 hour to complete the reaction. The product was a clear, light amber, viscous liquid.

A 0.1% aqueous solution of the product was clear and had a pH of 6.8. This test solution also had a surface tension of 34.7 dynes per centimeter, a Draves sink time of 68.6 seconds, a dynamic foam height at 77° F. at 400 milliliters per minute of 45/20, and a dynamic foam height at 120° F. at 400 milliliters per minute of 0. The cloud point of a 1.0% solution was 30.5° C.

Example 3i—Reaction Product of Poly-(2-Hydroxypropyl)Propylene Glycol Glycoside and Diglycidyl Ether Having about 13 Propylene Oxide Units Using the procedure of Example 3a, equal weight quantities of poly-(2-hydroxypropyl)-propylene glycol glycoside (product of Example 2c) and a diglycidyl ether having about 13 propylene oxide units (product of Example 1a) were reacted with sodium hydroxide as catalyst. The resulting product was tested and a 0.1% aqueous solution had a surface tension of 35.5 dynes per centimeter, a Draves sink time of 45.7 seconds, a dynamic foam height at 77° F. at 400 milliliters per minute of 105/5, and a dynamic foam height at 120° F. at 400 milliliters per minute of 0. The cloud point of a 1.0% aqueous solution was 35.5° C.

Example 3j—Reaction Product of Poly-(2-Hydroxypropyl)Propylene Glycol Glycoside and Diglycidyl Ether Having about 18 Propylene Oxide Units Using the procedure of Example 3a, equal weight quantities of poly-(2-hydroxypropyl)-propylene glycol glycoside (product of Example 2c) and a diglycidyl ether having about 18 propylene oxide units (product of Example 1b) were reacted with sodium hydroxide as catalyst. The resulting product was tested, and a 0.1% aqueous solution had a surface tension of 35.0 dynes per centimeter, a Draves sink time of 33.1 seconds, a dynamic foam height at 77° F. at 400 milliliters per minute of 80/25, and a dynamic foam height at 120° F. at 400 milliliters per minute of 0. The cloud point of a 1.0% aqueous solution was 35° C.

Example 3k—Reaction Product of Poly-(2-Hydroxypropyl)Propylene Glycol Glycoside and Diglycidyl Ether Having about 34 Propylene Oxide Units Using the procedure of Example 3a, equal weight quantities of poly-(2-hydroxypropyl)-propylene glycol glycoside (product of Example 2c) and a diglycidyl ether having about 34 propylene oxide units (product of Example 1c) were reacted with sodium hydroxide as catalyst. The resulting product was tested and a 0.1% aqueous solution had a surface tension of 34.7 dynes per centimeter, a Draves sink time of 78.1 seconds, a dynamic foam height at 77° F. at 400 milliliters per minute of 28/5, and a dynamic foam height at 120° F. at 400 milliliters per minute of 0. The cloud point of a 1.0% aqueous solution was 13°–23° C.

These products have good surface activity as indicated by surface tensions in the range of 30 dynes per centimeter and a Draves sink time in the range of 45-60 seconds at 0.1% concentration. At the same time the products also exhibit excellent defoaming capability. The combination of surface activity and defoaming activity is unexpected and can provide a wide variety of uses.

The Dynamic Foam Height test used herein is adequately described in an article by H. E. Reich in the April, 1961 issue of *Soap and Chemical Specialties*, Vol. 37, page 55. The Draves sink test is adequately described in an article by C. Z. Draves and R. G. Clarkson, Vol. 20, *American Dye Reporter*, pages 201-8 (1931). The values reported are the length of time, in seconds, that it takes a 5-gram skein of cotton rope, weighted with a 3-gram hook and placed into the solution to be tested, to sink. Solutions containing 0.1 weight percent of superior wetting agents usually exhibit values on the order of 60 seconds or less.

One of the uses of the surfactants made in accordance with the invention is the use thereof as a defoamer in glycol-based antifreeze. The surfactants are not only excellent in their defoaming capability and thereby render formulations with high foaming tendencies quite suitable, they also have good solubility in glycol-based antifreeze.

EXAMPLE 4

PREPARATION OF ANTIFREEZE COMPOSITIONS ACCORDING TO THE INVENTION

A typical base antifreeze solution was prepared by mixing the following ingredients in the proportions given (said proportions are by weight):

| Component | Percentage |
|---|---|
| Ethylene Glycol | 90.61 |
| Diethylene Glycol | 4.99 |
| $Na_2B_4O_7 \cdot 5H_2O$ | 1.32 |
| NaOH (50% solution) | 0.74 |
| Sodium Mercaptobenzothiazole (50% solution) | 0.15 |
| Sodium Nitrite | 0.05 |
| Water | 2.04 |
| 1-Carboxy-2-hexyl-5-(7-carboxyheptyl)-cyclohex-3-ene | 0.10 |

Example 4a through 4k—Antifreeze Compositions Containing Various Defoaming Agents Compositions containing the surfactants of Examples 3a through 3k as defoaming agents were prepared by adding said surfactants to the base antifreeze composition of Example 4 in a weight percent of 0.1%. Thus Example 4a contains 0.1% of the product of Example 3a, Example 4b contains 0.1% of the product of Example 3b, and correspondingly through the series with Example 4k containing 0.1% of the product of Example 3k.

Example 4l—Comparison Example

A prior art defoamer was also used to make an antifreeze for comparison tests. This defoamer consists of a polyoxyethylene adduct of polyoxypropylene having a molecular weight of about 1750 and containing 10% by weight of ethylene oxide units. The comparison antifreeze is prepared by adding this defoamer to the base antifreeze in a weight percent of 0.03%, which is the amount of this defoamer generally used.

The antifreeze compositions of Example 3 were tested to determine foaming characteristics according to ASTM D-1881 method. In all cases, the solution was 33⅓% antifreeze and the remainder water. The results of the tests are given in the table below.

TABLE

| Antifreeze Solution | Foam Height, ml/ Break Time, Sec. |
| --- | --- |
| Base Antifreeze of Example 4 | Foamed out of test Vessel |
| Example 4a | 85/2 |
| Example 4b | 73/2 |
| Example 4c | 70/1.8 |
| Example 4d | 91/2 |
| Example 4e | 95/4 |
| Example 4f | 91/2 |
| Example 4g | 70/2 |
| Example 4h | 105/2 |
| Example 4i | 70/1.6 |
| Example 4j | 75/2 |
| Example 4k | 70/2 |
| Example 4l | 290/10 |

From the Table, it is seen that the surfactants of the invention have excellent foam suppressing capability, and that, in this respect, they are much superior to the foam suppressing agents now in use.

From the foregoing description, it is seen that the invention provides a new group of surfactants having certain desirable properties. It is also seen that antifreeze compositions may be made using the surfactants described herein. It will also be appreciated that these surfactants have improved solubility in antifreeze, thereby solving a storage problem heretofore encountered. Moreover, the formulations have such good defoaming properties that they are suitable for use with corrosion inhibitor systems which would otherwise cause excessive foam.

The embodiments of the invention in which an exclusive property or privilege is claimed are defined as follows:

1. A material formed by the reaction of (1) a poly-2-hydroxyalkyl derivative of a polyol having at least 5 hydroxyl groups, with at least 3 of said hydroxyl groups being substituted with 2-hydroxyalkyl groups and (2) a hydrophobic polyglycidyl ether of a polyoxyalkylene polyol said polyoxyalkylene polyol having a molecular weight greater than about 300.

2. The material defined in claim 1 in which the poly-2-hydroxyalkyl derivative of a polyol has the formula

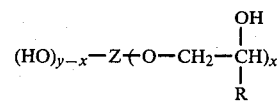

wherein Z is the nucleus of a polyol normally having y hydroxyl groups, y is an integer from 5 to 8, x is an integer from 3 to y, and R is hydrogen, methyl or ethyl with at least 50% of the R groups being methyl or ethyl.

3. The material defined in claim 2 in which Z is a sucrose nucleus.

4. The material defined in claim 2 in which Z is a glucose nucleus.

5. The material defined in claim 2 in which Z is a sorbitol nucleus.

6. The material defined in claim 1 in which the hydrophobic polyglycidyl ether is a diglycidyl ether.

7. The material defined in claim 6 in which the hydrophobic diglycidyl ether has the formula

wherein R is hydrogen, methyl or ethyl with at least 50% of the R groups being methyl or ethyl groups, and n is an integer from 2 to 40.

8. The material defined in claim 1 in which the hydrophobic polyglycidyl ether is a triglycidyl ether.

9. An antifreeze composition comprising a glycol freezing point depressant, a corrosion inhibitor system, and a foam suppressing agent present in an amount of from about 0.001% to about 0.1% by weight of the antifreeze composition; said foam suppressing agent comprising the reaction product of (1) a poly-2-hydroxyalkyl derivative of a polyol having at least 5 hydroxyl groups, with at least 3 of said hydroxyl groups being substituted with one or more 2-hydroxyalkyl groups and (2) a hydrophobic polyglycidyl ether of a polyoxyalkylene polyol, said polyoxyalkylene polyol having a molecular weight greater than about 300.

10. The antifreeze composition defined in claim 9 in which the poly-2-hydroxyalkyl derivative of a polyol has the formula

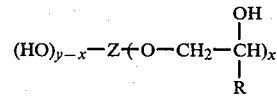

wherein Z is the nucleus of a polyol normally having y hydroxyl groups, y is an integer from 5 to 8, x is an integer from 3 to y, and R is hydrogen, methyl or ethyl with at least 50% of the R groups being methyl or ethyl.

11. The antifreeze composition defined in claim 10 in which Z is a sucrose nucleus.

12. The antifreeze composition defined in claim 10 in which Z is a glucose nucleus.

13. The antifreeze composition defined in claim 10 in which Z is a sorbitol nucleus.

14. The antifreeze composition defined in claim 9 in which the hydrophobic polyglycidyl ether is a diglycidyl ether.

15. The antifreeze composition defined in claim 14 in which the hydrophobic diglycidyl ether is a compound having the formula

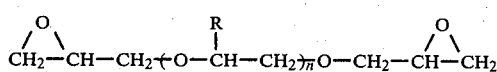

wherein R is hydrogen, methyl or ethyl with at least 50% of the R groups being methyl or ethyl, and n is an integer from 2 to 40.

16. The antifreeze composition defined in claim 9 in which the hydrophobic polyglycidyl ether is a triglycidyl ether.

17. An antifreeze composition as defined in claim 9 in which the corrosion inhibitor system comprises from 0.01% to 1% by weight of the antifreeze of at least one substance selected from the group consisting of a. compounds corresponding to the structural formula

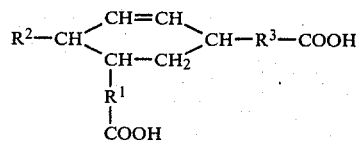

wherein $R^1$ is an alkylene radical containing from 0 to 12 carbon atoms, $R^2$ is an alkyl radical containing from 1 to 10 carbon atoms and $R^3$ is an alkylene radical containing from 1 to 12 carbon atoms, and b. the mono- and di-metal salts, the mono- and di-ammonium salts, and the mono- and di-amides of a.

18. An antifreeze composition as defined in claim 10 wherein the inhibitor comprises 1-carboxy-2-hexyl-5-(7-carboxyheptyl)-cyclohex-3-ene.

* * * * *